United States Patent [19]
Lai et al.

[11] Patent Number: 5,581,496
[45] Date of Patent: Dec. 3, 1996

[54] ZERO-FLAG GENERATOR FOR ADDER

[75] Inventors: Shiang-Jhy Lai, Taipei; Hwai-Tsu Chang, Nantou, both of Taiwan

[73] Assignee: Industrial Technology Research Institute, Hsinchu, Taiwan

[21] Appl. No.: 320,236

[22] Filed: Oct. 11, 1994

Related U.S. Application Data

[63] Continuation of Ser. No. 915,289, Jul. 20, 1992, abandoned.

[51] Int. Cl.$^6$ .................................................... G06F 7/00
[52] U.S. Cl. .................................................... 364/736.5
[58] Field of Search ...................... 364/715.09, 715.01, 364/736.5, 768, 784–788

[56] References Cited

U.S. PATENT DOCUMENTS

| | | | |
|---|---|---|---|
| 3,983,382 | 9/1976 | Weinberger | 364/736.5 X |
| 4,878,189 | 10/1989 | Kawada | 364/736.5 |
| 4,947,359 | 8/1990 | Vassiliadis et al. | 364/736.5 X |
| 5,020,016 | 5/1991 | Nakano et al. | 364/736.5 |

*Primary Examiner*—Roy N. Envall, Jr.
*Assistant Examiner*—Chuong D. Ngo
*Attorney, Agent, or Firm*—H. C. Lin

[57] ABSTRACT

Parallel processing architecture is used for an adder and its "look-ahead" zero-flag generator, which generates a flag signal for the most significant bit of the sum of the adder. The look-ahead zero-flag is generated with combinatorial logic circuits, which are fed from the addends and augents of the different bits for the adder and then decoded. The combinatorial logic circuits may comprise AND gates and XOR gates in a gate-array, and the decoder may be a programmable logic array (PLA). The computation time for the zero-flag thus generated is shorter than the computation time for the sum of the adder.

6 Claims, 6 Drawing Sheets

```
---------------------Genesil Version v8.0---------------------
test                 TA and SPICE comparison
--------------------------------------------------------------

Fabline: TSM_CN12A         Corner: GUARANTEED
Temperature: 75 degC       Voltage: 5.00v
Output Loading(pf):
  wE_z     0.10
Included setup files:
  $0 Default
--------------------------------------------------------------
```

| Node name | Trans. | TA | SPICE | diff | percent | display | |
|---|---|---|---|---|---|---|---|
| wE_z(2) | rise(2.5v) | 15.0 | 16.7 | -1.7 | -10.3% | ON | OFF |
| zero_flag/ZERO_OUT(6) | rise(2.5v) | 14.8 | 16.7 | -1.9 | -11.5% | ON | OFF |
| zero_flag/111(8) | fall(2.5v) | 14.4 | 16.1 | -1.7 | -10.3% | ON | OFF |
| zero_flag/110(10) | rise(2.5v) | 13.4 | 14.8 | -1.4 | -9.3% | ON | OFF |
| zero_flag/IN[25](13) | fall(2.5v) | 10.9 | 11.4 | -0.5 | -4.0% | ON | OFF |
| NDP_adder/OUT[25](17) | fall(2.5v) | 10.9 | 11.4 | -0.5 | -4.0% | ON | OFF |
| NDP_adder/427(18) | rise(2.5v) | 10.4 | 11.3 | -0.9 | -7.7% | ON | OFF |
| NDP_adder/121(19) | rise(2.5v) | 10.1 | 10.0 | 0.1 | 1.2% | ON | OFF |
| NDP_adder/525(21) | fall(2.5v) | 8.9 | 8.9 | -0.0 | -0.1% | ON | OFF |
| NDP_adder/528(22) | rise(2.5v) | 8.1 | 8.1 | 0.0 | 0.5% | ON | OFF |
| NDP_adder/531(23) | fall(2.5v) | 7.5 | 1.3 | 6.2 | 466.0% | ON | OFF |
| NDP_adder/521(26) | rise(2.5v) | 6.5 | 7.8 | -1.3 | -16.4% | ON | OFF |
| NDP_adder/208(30) | fall(2.5v) | 5.5 | 5.7 | -0.2 | -3.0% | ON | OFF |
| NDP_adder/659(34) | rise(2.5v) | 4.5 | 5.4 | -0.9 | -16.0% | ON | OFF |
| NDP_adder/279(35) | rise(2.5v) | 2.7 | 2.7 | -0.0 | -1.7% | ON | OFF |
| NDP_adder/1044(38) | fall(2.5v) | 1.6 | 1.9 | -0.3 | -14.0% | ON | OFF |
| NDP_adder/IN1[20](40) | rise(2.5v) | 0.0 | 0.0 | 0.0 | 0.0% | ON | OFF |
| DIn_a[20](42) | fall(2.5v) | 0.0 | 0.0 | 0.0 | 0.0% | ON | OFF |

TABLE 1

FIG. 5

Module: ~genteam2/team2/I30/Parrel_DaPth/ADDER                TA-SPICE
————————————Genesil Version v8.0.2_DV3_0913_sun4os4————————————
test4                        TA and SPICE comparison Fabline: TSM_CN12A           Corner: GUARANTEED
Temperature: 75 degC         Voltage: 5.00v
Output Loading(pf):
   wE_z     0.10
Included setup files:
   #0 Default

| Node name | Trans. | TA | SPICE | diff | percent | display |
|---|---|---|---|---|---|---|
| wE_z (2) | rise(2.5v) | 16.1 | 12.8 | 3.3 | 26.0% | ON OFF |
| ZERO_DECODER/ZERO(6) | rise(2.5v) | 16.0 | 12.8 | 3.2 | 25.2% | ON OFF |
| ZERO_DECODER/68 (8) | fall(2.5v) | 15.6 | 12.2 | 3.4 | 28.1% | ON OFF |
| ZERO_DECODER/72 (10) | rise(2.5v) | 14.5 | 11.2 | 3.3 | 29.1% | ON OFF |
| ZERO_DECODER/73 (11) | fall(2.5v) | 13.8 | 10.2 | 3.6 | 35.2% | ON OFF |
| ZERO_DECODER/1741 (16) | rise(2.5v) | 12.4 | 8.9 | 3.5 | 39.1% | ON OFF |
| ZERO_DECODER/1732 (18) | fall(2.5v) | 12.1 | 8.2 | 3.9 | 47.3% | ON OFF |
| ZERO_DECODER/1733 (19) | rise(2.5v) | 11.4 | 8.9 | 2.5 | 28.8% | ON OFF |
| ZERO_DECODER/1950 (41) | fall(2.5v) | 4.6 | 4.1 | 0.5 | 12.2% | ON OFF |
| ZERO_DECODER/33 (42) | rise(2.5v) | 3.6 | 3.2 | 0.4 | 13.2% | ON OFF |
| ZERO_DECODER/XOR[0] (43) | fall(2.5v) | 2.3 | 2.2 | 0.1 | 7.0% | ON OFF |
| GATE_ARRAY/xout0 (52) | fall(2.5v) | 2.3 | 2.1 | 0.2 | 7.5% | ON OFF |
| GATE_ARRAY/NN_N94 (53) | rise(2.5v) | 1.8 | 1.9 | -0.1 | -4.4% | ON OFF |
| GATE_ARRAY/y0 (55) | fall(2.5v) | 0.0 | 0.0 | -0.0 | -100.0% | ON OFF |
| Din_b[0](60) | fall(2.5v) | 0.0 | 0.0 | 0.0 | 0.0% | ON OFF |

TABLE 2

```
PLA_SOURCE                              STATE

INPUTS CIN, XOR[31:0], AND[31:0];       NAME = Z_OUTPUT;
                                        SIGNALS = ZERO;
OUTPUTS ZERO;                           VALUE = Z0,0;
                                        VALUE = Z1,1;
STATE
   NAME = ICODE;                        ENDSTATE
   SIGNALS = CIN, XOR[31:0], AND[31:0];
   VALUE = B0 ,00000000000000000000000000000000000000000000000000000000000000000;
   VALUE = B1 ,00000000000000000000000000000000000000000000000000000000000000000;
   VALUE = B2 ,01000000000000000000000000000000000000000000000000000000000000000;
   VALUE = B3 ,01100000000000000000000000000000000000000000000000000000000000000;
   VALUE = B4 ,01110000000000000000000000000000000000000000000000000000000000000;
   VALUE = B5 ,01111000000000000000000000000000000000000000000000000000000000000;
   VALUE = B6 ,01111100000000000000000000000000000000000000000000000000000000000;
   VALUE = B7 ,01111110000000000000000000000000000000000000000000000000000000000;
   VALUE = B8 ,01111111000000000000000000000000000000000000000000000000000000000;
   VALUE = B9 ,01111111100000000000000000000000000000000000000000000000000000000;
   VALUE = B10,01111111110000000000000000000000000000000000000000000000000000000;
   VALUE = B11,01111111111000000000000000000000000000000000000000000000000000000;
   VALUE = B12,01111111111100000000000000000000000000000000000000000000000000000;
   VALUE = B13,01111111111110000000000000000000000000000000000000000000000000000;
   VALUE = B14,01111111111111000000000000000000000000000000000000000000000000000;
   VALUE = B15,01111111111111100000000000000000000000000000000000000000000000000;
   VALUE = B16,01111111111111110000000000000000000000000000000000000000000000000;
   VALUE = B17,01111111111111111000000000000000000000000000000000000000000000000;
   VALUE = B18,01111111111111111100000000000000000000000000000000000000000000000;
   VALUE = B19,01111111111111111110000000000000000000000000000000000000000000000;
   VALUE = B20,01111111111111111111000000000000000000000000000000000000000000000;
   VALUE = B21,01111111111111111111100000000000000000000000000000000000000000000;
   VALUE = B22,01111111111111111111110000000000000000000000000000000000000000000;
   VALUE = B23,01111111111111111111111000000000000000000000000000000000000000000;
   VALUE = B24,01111111111111111111111100000000000000000000000000000000000000000;
   VALUE = B25,0
   VALUE = B26,0
   VALUE = B27,0
   VALUE = B28,0
   VALUE = B29,0
   VALUE = B30,0
   VALUE = B31,0
   VALUE = B32,0
   VALUE = B33,
ENDSTATE

SWITCH ICODE
   CASE B0  : Z1
   CASE B1  : Z1
   CASE B2  : Z1
   CASE B3  : Z1
   CASE B4  : Z1
   CASE B5  : Z1
   CASE B6  : Z1
   CASE B7  : Z1
   CASE B8  : Z1
   CASE B9  : Z1
   CASE B10 : Z1
   CASE B11 : Z1
   CASE B12 : Z1
   CASE B13 : Z1
   CASE B14 : Z1
   CASE B15 : Z1
   CASE B16 : Z1
   CASE B17 : Z1
   CASE B18 : Z1
   CASE B19 : Z1
   CASE B20 : Z1
   CASE B21 : Z1
   CASE B22 : Z1
   CASE B23 : Z1
   CASE B24 : Z1
   CASE B25 : Z1
   CASE B26 : Z1
   CASE B27 : Z1
   CASE B28 : Z1
   CASE B29 : Z1
   CASE B30 : Z1
   CASE B31 : Z1
   CASE B32 : Z1
   CASE B33 : Z1
   DEFAULT : Z0
ENDSWITCH

END
```

ZERO-FLAG GENERATOR FOR ADDER

This application is a continuation of application Ser. No. 07/915,289, filed Jul. 20, 1992, abandoned.

BACKGROUND

This invention is related to adders for the arithmatic logic unit (ALU) of a computer.

An adder is an important element in an arithmatic logic unit (ALU). Two n-bit input data and carry data can produce (n+1) bit sum output. In an ALU, the adder is often accompanied with a "zero-flag" generator to determine whether the sum output of the most significant bit is zero or not for activating other related control circuits. A conventional zero-flag generator, as shown in FIG. 1, is composed of a group of NOR logic gates. As shown in this figure, the data inputs Din_a and Din_b are summed with the carry signal CIN of a previous stage in an adder. For the (n–1)th bit, the sum output cannot be determined until the output of the least significant bit is rippled through all the intermediate bits to reach the (n–1)th bit. The adder has a sum output OVF and a carry output Co, which are fed to the terminals WE_v and WE_c respectively. Besides, another output is fed to a zero-flag generator A=0? to determine whether the sum is zero or not. If the sum is zero, a zero-flag signal appears on line Z and is fed to terminal WE_Z.

In this process, the zero-flag signal is generated after an adder has produced a result, and is not predicted ahead of time. Thus, the processing speed is slow without the "zero look ahead" feature. Only one relative solution to this problem is disclosed in the U.S. Pat. No. 4,878,189. In this patent, the arithmatic logic unit (ALU) is executed for addition function. The patented circuit belongs to traditional implementation methods, in that there is delay of the critical path in the design of the central processing unit (CPU).

SUMMARY

An object of this invention is to implement a "look-ahead" zero-flag generator in parallel with the adder in an ALU, so that addition and zero-flag detection are processed simultaneously to speed up the operation. Another object of this invention is to obtain a zero-flag signal before the summation signal of an adder. Still another object of this invention is to use Exclusive OR gates and AND gates to implement the "look-ahead" zero-flag generator. A further object of this invention is to utilize a programmable logic array (PLA) to decode the large number of conditions for realizing the algorithms of the zero-flag generator.

The object is achieved in this invention by processing signals to the zero-flag generator in parallel with processing signals to the adder for achieving the zero look-ahead function. The preprocessing utilizes AND and Exclusive-OR gates to define all the combinations for yielding a zero-flag for the most significant bit of the sum of the adder. The large number of conditions can be implemented with a gate-array and decoded with a programmable logic array to yield the zero-flag signal.

BRIEF DESCRIPTION OF THE DRAWINGS

FIG. 5 (Table 1) shows the delay time of a conventional zero-flag generator (16.7 ns), as computed by two computer analysis programs—TA and SPICE.

FIG. 6 (Table 2) shows the delay time (12.8 ns) of a zero-flag generator of the present invention, as computed by the computer analysis programs—TA and SPICE.

FIG. 7 (Table 3) shows the source code equations of the PLA used in the example shown in FIG. 3.

DETAILED DESCRIPTION OF THE PREFERRED EMBODIMENT

Figure 1:
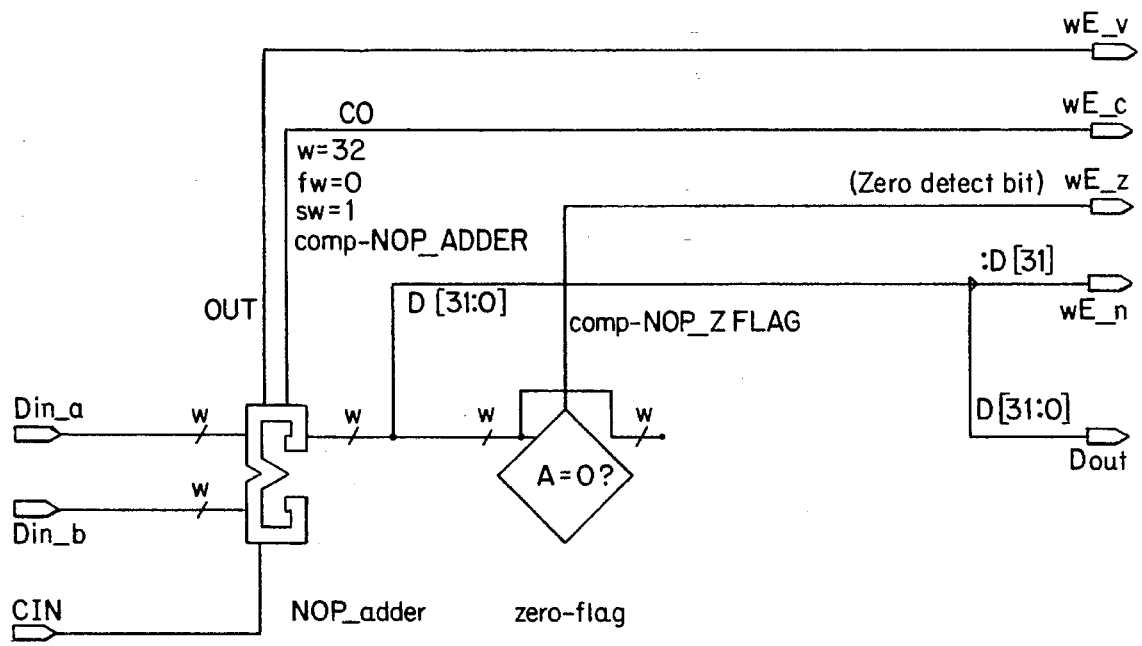
FIG. 1 shows a conventional architecture of a zero-flag generator.
Figure 2:
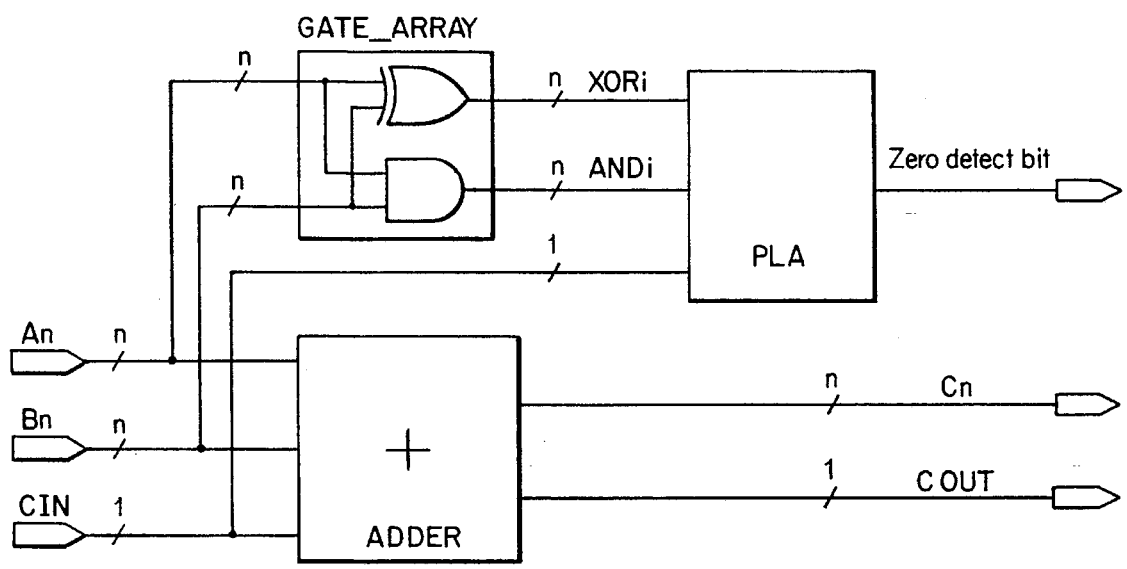
FIG. 2 shows the block diagram of the zero-flag generator based on the present invention.

The block diagram of the present invention is shown in FIG. 2. There are n number of XOR gates and n number of AND gates in the form of a gate array, where n is the maximum number of bits of the addend or the augent. The gate array is used to produce the $XOR_i$ and $AND_i$ ($i=0,1,2,\ldots,n-1$) signals for a PLA. The decoded PLA output serves as a zero detect bit.

The necessary PLA source code equations can be deduced as follows:

Let $A_n = \langle a_{n-1}, a_{n-2}, \ldots, a_o \rangle$ be the augent, where $a_{n-1}$ is the most significant bit (MSB), and $a_o$ is the least significant bit (LSB).

$B_n = \langle b_{n-1}, b_{n-2}, \ldots, b_o \rangle$ be the addend, where $b_{n-1}$ is the MSB, and $b_o$ is the LSB.

$CIN = \langle C_{-1} \rangle$ be the LSB carry bit.

$S_n = \langle S_{n-1}, S_{n-2}, \ldots, S_o \rangle = A_n 30 B_n + CIN$ is the total sum of the n-th bit, where $S_{n-1}$ is the MSB, and $S_o$ is the LSB.

Define $XOR_i = a_i \hat{\,} b_i$, $AND_i = a_i \cdot b_i$ ($i=0,1,\ldots,n-1$). The value of $S_n$ can be zero. The conditions for the $S_n=0$ or zero detect bit to be "1" are as follows:

case 1: $XOR_i=1$ ($i=0,1,\ldots,n-1$), $AND_i=0$ ($i=0,1,\ldots,n-1$), $CIN=1$.

(*This condition can be seen quite readily. If the AND gate output for every bit is "0", and the XOR gate output for every bit is "1", then $a_i$ or $b_i$ is "1", but not both (for $i=0,1,\ldots,n-1$). Thus, when $CIN=1$ is summed with $a_o$ and $b_o$, a sum $S_o=0$ and a carry signal $c_o=1$ are produced. In this manner, the sum $S_o$ and the carry signal "1" are propagated toward the (n–1)th bit. The sum $S_o$ must then be "0".

case 2: $XOR_i=1$ ($i=1,2,\ldots,n-1$), $AND_i=1$ ($i=0$), $CIN=0$, $XOR_i=0$ ($i=0$), $AND_i=0$ ($i=1,2,\ldots,n-1$).

(*Since $AND_0=1$ and $XOR_i=0$, that means that $a_o=b_o=1$ and carry signal $c_o 32\, 1$. For all the higher significant bits (i.e. i>0), $XOR_i=1$ means that either $a_i$ or $b_i$ is "1" but not both. Thus, when $C_0=1$ is summed with $a_1$ and $b_1$, a sum $S_1=0$ and a carry signal $C_1=1$ is produced. In this manner, the sum $S_1$ and the carry signal "1" are propagated toward the (n–1)th bit. The sum $S_n$ must then be "0". With similar reasoning, the following conditions can be deduced)

case 3: $XOR_i=1$ ($i=2,3,\ldots,n-1$), $AND_i=1$ ($i=1$), $CIN=0$, $XOR_i=0$ ($i=0,1$), $AND_i=0$ ($i=0,2,3,\ldots,n-1$).

case 4: $XOR_i=1$ ($i=3,4,\ldots,n-1$), $AND_i=1$ ($i=2$), $CIN=0$, $XOR_i=0$ ($i=0,1,2,$), $AND_i=0$ ($i=0,1,3,\ldots,n-1$).

case n: $XOR_1=1$ ($i=n-1$), $AND_i=1$ ($i=n-2$), $CIN=0$. $XOR_i=0$ ($i=0,1,\ldots,n-2$), $AND_i=0$ ($i=0,1,\ldots,n-3,n-1$)

case n+1: $XOR_i=0$ ($i=0,1,\ldots,n-1$), $AND_i=1$ ($i=n-1$), $CIN=0$.

case n+2; $XOR_i=0$ ($i=0,1,\ldots,n-1$), $AND_i=0$ ($i=0,1,\ldots,n-1$), $CIN=0$.

The foregoing equations can also be proved by the associative law of Boolean algebra.

The foregoing Boolean conditions can be implemented by the architecture shown in FIG. 2. The XOR gates and the AND gates for n number of bits are implemented in the Gate-Array block, which have n outputs of $XOR_i$ and n outputs of $AND_i$. These XOR gate and AND gate outputs are decoded by a PLA. As a PLA has an AND plane and an OR plane, the different $XOR_i$ and $AND_i$ outputs from the gate array are fed as inputs to the AND plane and perform the AND function for each case. Each condition produces a "1" zero detect bit output. The outputs from the AND plane are then fed to the OR plane to produce the zero-flag signal.

Figure 3:
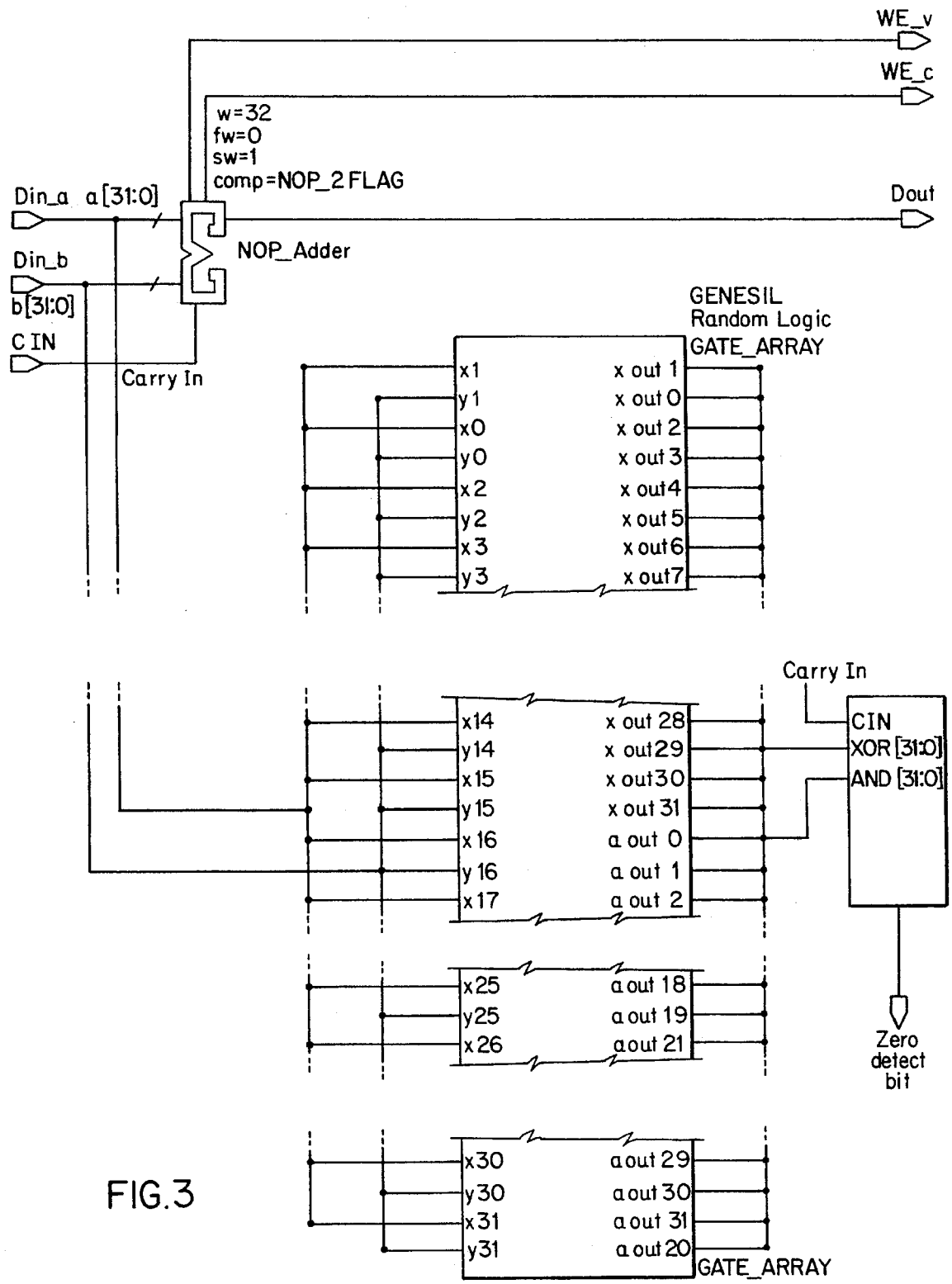
FIG. 3 shows the schematic entry in GENESIL enviroment as a practical example of the present invention.
Figure 4:
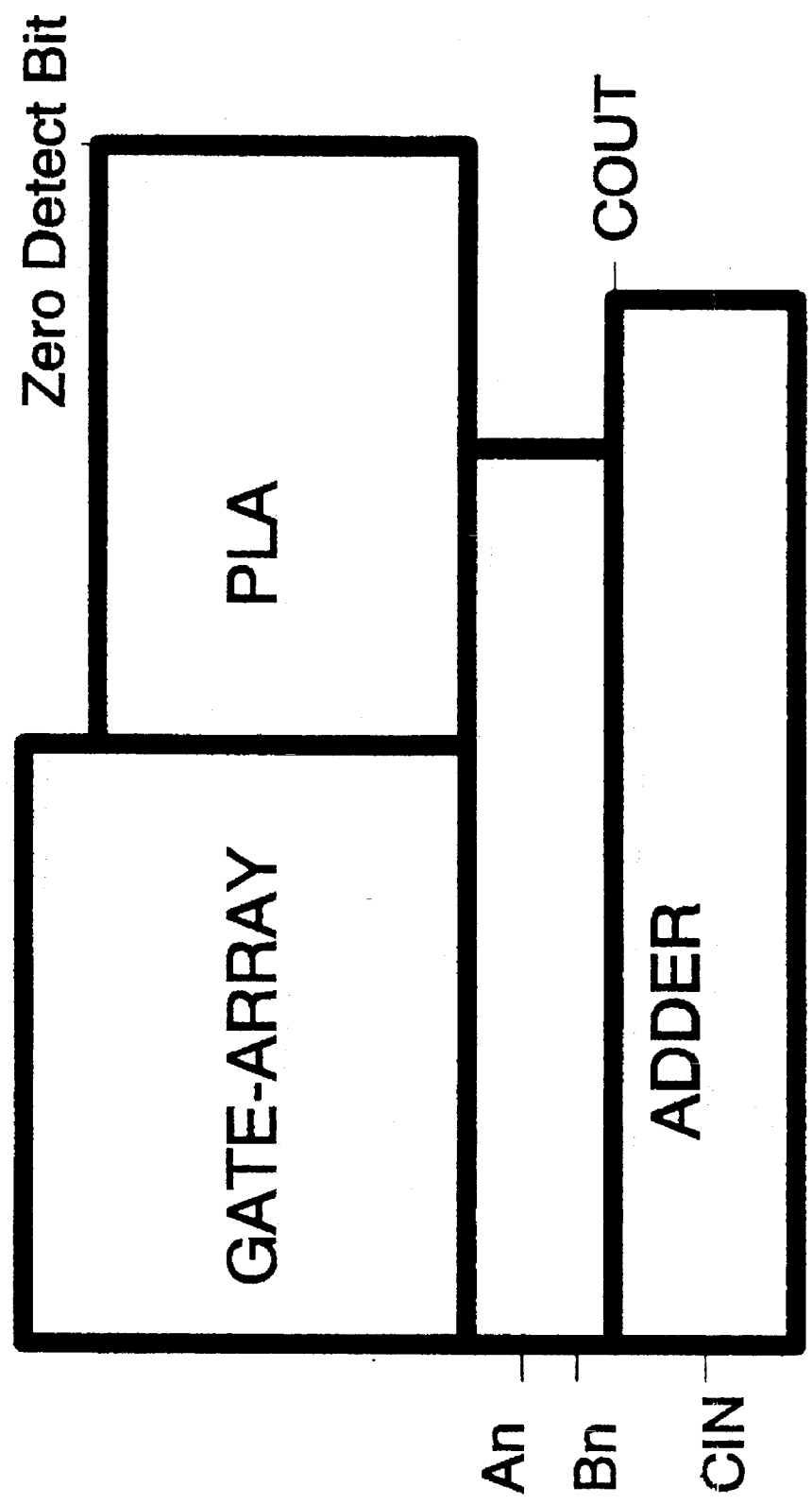
FIG. 4 shows the layout of the example shown in FIG. 3.

The present method has been used in a developmental work station, SPARC, as a practical example. The zero-flag generator is designed into the integer unit (IU), (i.e., SPARC CPU) to improve the speed of the control circuit. FIG. 3 shows the schematic entry, which is a representation diagram of logic circuit connected by icons of logic function, in a CAD tool GENESIL enviroment. This CAD tool is from the Mentor Graphics Co. for IC design. The carry look ahead adder based on the present invention uses a custom layout. The gate-array uses a standard cell approach. The PLA also uses custom layout, which are based on the source code equations described earlier. A 1.2 micron design rule is used in the layout. The circuit was analyzed with the TA timing analysis program and the SPICE circuit analysis program. The delay time for the worst-case critical path is 12.8 ns (see Table 2) for the present invention, as compared to the delay time of 16.7 for conventional circuit.

If the gate-array is implemented with custom layout, the chip area can be reduced. The circuits used in the gate array can also share with certain "look-ahead carry" circuits used in the adders, because a gate array has the same logic function definition in some adder structure, (e.g. carry look ahead adder). In such a case, the gate-array may not be needed.

While the foregoing description is based on addition, the same technique can be used for subtraction to obtain a zero-flag, by changing the input to its 1's or 2's complement. The technique falls within the scope of this invention.

What is claimed is:

1. A zero-flag generator for digital adder with n-bits of input data including a one-bit input carry signal for producing output sum signal and an output carry signal comprising:

means for detecting said output sum no later than the production of said sum from said adder, comprising:

a plurality of logic combinations of only Exclusive-OR (XOR) gates and AND gates: having individual inputs for each of said bits which are the same as the individual inputs for the corresponding bits of said adder for outputting the logic combination signals XORi and ANDi, where i=0,1, . . . ,n–1, for each of said bits, and a decoder for decoding the outputs of said logic gate combinations with an carry to generate a zero-flag in accordance to the number of combinations of said input carry and said logic combination signals for said zero-flag to be zero.

2. A zero-flag generator as described in claim 1, where each of said logic gate combinations comprises only an XOR gate and an AND gate.

3. A zero-flag generator as described in claim 2, wherein logic gate combinations are implemented with gate arrays.

4. A zero-flag generator as described in claim 2, wherein said decoder decoding outputs of said logic gate combinations is a programmable logic array (PLA).

5. A zero-flag generator as described in claim 2, wherein said conditions for said zero-flag to be zero with addends $a_i$ and augends $b_i$ (where i=0,1,2, . . . ,n–1) and the carry signal to the least significant bit CIN are:

case 1: $XOR_i=1$ (i=0.1, . . . ,n–1), $AND_i=0$ (i=0,1, . . . ,n–1), CIN=1;

case 2: $XOR_i=1$ (i=1,2, . . . ,n–1), $AND_i=1$ (i=0), CIN=0, $XOR_i=0$, (i=0), $AND_i=0$ (i=1,2, . . . ,n–1);

case 3: $XOR_i=1$ (i=2,3, . . . ,n–1), $AND_i=1$ (i=1), CIN=0, $XOR_i=0$ (i=0,1), $AND_i=0$ (i=0,2,3, . . . ,n–1);

case 4: $XOR_i=1$ (i=3,4, . . . ,n–1), $AND_i=1$ (i=2), CIN=0, $XOR_i=0$ (i=0,1,2), $AND_i=0$ (i=0,1,3, . . . ,n–1);

case n: $XOR_i=1$ (i=n–1), $AND_i=1$ (i=n–2), CIN=0, $XOR_i=0$ (i=0,1, . . . ,n–2), $AND_i=0$ (i0,1, . . . ,n–3,n–1);

case n+1: $XOR_i=0$ (i=0,1, . . . ,n–1), $AND_i=1$ (i=n–1), CIN=0; . . .

case n+2: $XOR_i=0$ (i=0,1, . . . ,n–1), $AND_i=0$ (i=0,1, . . . ,n–1), CIN=0.

6. A zero-flag generator as described in claim 5, wherein said different in claim 6 are decoded with a PLA using the different conditions for zero-flag of said XOR gates and said AND gates in each case as inputs to the AND planes of said PLA and output of the OR plane of said PLA as said zero-flag signal.

* * * * *